US010093442B1

(12) United States Patent
Rooyakkers

(10) Patent No.: US 10,093,442 B1
(45) Date of Patent: Oct. 9, 2018

(54) INFEED SYSTEM AND METHOD FOR PRODUCT PACKAGING MACHINE

(71) Applicant: Valley Tissue Packaging, Inc., Kaukauna, WI (US)

(72) Inventor: Michael Rooyakkers, Combined Locks, WI (US)

(73) Assignee: Valley Tissue Packaging, Inc., Kaukauna, IA (US)

( * ) Notice: Subject to any disclaimer, the term of this patent is extended or adjusted under 35 U.S.C. 154(b) by 412 days.

(21) Appl. No.: 14/876,093

(22) Filed: Oct. 6, 2015

Related U.S. Application Data

(60) Provisional application No. 62/062,393, filed on Oct. 10, 2014.

(51) Int. Cl.
*B65B 63/02* (2006.01)
*B65B 35/24* (2006.01)
*B65B 25/14* (2006.01)
*B65G 15/14* (2006.01)

(52) U.S. Cl.
CPC ......... *B65B 63/026* (2013.01); *B65B 35/243* (2013.01); *B65G 15/14* (2013.01); *B65B 25/145* (2013.01)

(58) Field of Classification Search
CPC ..... B65B 9/067; B65B 25/145; B65B 35/243; B65B 35/44; B65B 57/14; B65B 63/026; B65G 15/14
USPC ......... 53/439, 450, 530, 550; 198/577, 579, 198/592, 604, 626.2
See application file for complete search history.

(56) References Cited

U.S. PATENT DOCUMENTS

| | | | | |
|---|---|---|---|---|
| 3,120,172 A | * | 2/1964 | Enloe | B65B 63/026 100/41 |
| 3,512,624 A | * | 5/1970 | Crane | B65B 57/14 198/341.04 |
| 3,729,886 A | * | 5/1973 | Lucas et al. | B65B 63/026 53/209 |
| 3,747,743 A | * | 7/1973 | Hoffmann, Jr. | B65B 63/026 206/321 |
| 3,837,138 A | * | 9/1974 | Terry | B65B 63/026 53/439 |
| 3,848,398 A | * | 11/1974 | Suhr | B65B 63/026 53/530 |
| 3,944,049 A | * | 3/1976 | Graybill | B65G 37/02 198/444 |
| 4,182,443 A | * | 1/1980 | Pongracz | B65B 57/14 198/460.1 |
| 4,299,074 A | * | 11/1981 | Johansson et al. | B65B 63/026 100/211 |
| 4,328,655 A | * | 5/1982 | Spencer et al. | B65B 63/026 53/439 |

(Continued)

*Primary Examiner* — Stephen F Gerrity
(74) *Attorney, Agent, or Firm* — Boyle Fredrickson, S.C.

(57) ABSTRACT

An infeed system for feeding a product downstream to a packaging machine for packaging a product with a packaging material includes a first conveyor section, a second conveyor section, and a third conveyor section. Each one of the conveyor sections includes a top belt and a bottom belt that engage respective surfaces of the product. The speeds of each belt may be adjusted to control the processing rate of the product and prevent any gaps between successive products. The top belt of the first conveyor system may also be inclined relative to the bottom belt to compress the product.

19 Claims, 8 Drawing Sheets

(56) References Cited

U.S. PATENT DOCUMENTS

| | | | | |
|---|---|---|---|---|
| 4,592,193 | A | * | 6/1986 | Gustavsson ........... B65B 63/026 53/530 |
| 4,751,807 | A | * | 6/1988 | Couturier ............. B65B 63/026 493/444 |
| 4,858,416 | A | * | 8/1989 | Monaghan ................ B65B 9/02 53/373.5 |
| 5,195,300 | A | * | 3/1993 | Kovacs et al. ........ B65B 63/026 100/207 |
| 5,447,012 | A | * | 9/1995 | Kovacs et al. ........ B65B 25/146 53/370.6 |
| 5,564,261 | A | * | 10/1996 | Kiner ................... B65B 63/026 53/439 |
| 6,571,694 | B1 | * | 6/2003 | Gustafsson ........... B65B 63/026 100/151 |
| 7,398,630 | B2 | | 7/2008 | Kovacs |
| 2004/0020169 | A1 | * | 2/2004 | Haasl ................... B65B 63/026 53/450 |
| 2007/0199800 | A1 | * | 8/2007 | Qi ........................ B65B 63/026 198/626.5 |
| 2011/0289886 | A1 | * | 12/2011 | Martin et al. ........ B65B 25/145 53/436 |
| 2014/0137515 | A1 | * | 5/2014 | Brandhorst et al. ......................... B65B 63/026 53/439 |

* cited by examiner

INFEED SYSTEM AND METHOD FOR PRODUCT PACKAGING MACHINE

CROSS-REFERENCE TO RELATED APPLICATION

The present application claims priority on U.S. Provisional Patent Application Ser. No. 62/062,393, filed Oct. 10, 2014 and entitled Infeed System for Product Packaging Machine, the entirety of which is hereby incorporated herein by reference.

BACKGROUND OF THE INVENTION

I. Field of the Invention

The present invention relates to a method and apparatus for packaging compressible products such as napkins, rolls of toilet paper and paper towels. More particularly, the present invention relates to a method and apparatus for the continuous packaging of products.

2. Discussion of the Related Art

A wide variety of consumer products are mass production wrapped in a heat sealable wrapping material before being delivered to the customer. For example, numerous paper products such as napkins, paper toweling rolls, or toilet paper rolls are wrapped in a thermoplastic material such as polyethylene. The thermoplastic wrapper serves to bundle the articles tightly together and to protect them from moisture and abrasion.

As is often the case for products prepared for the consumer mass market, the cost per unit article is strongly dependent on the amount of time required for each operation, including packaging. Known prior art packaging machines require the product to be diverted from its direction of motion several times during the packaging operation to produce a sealed overwrap of heat sealable material around the product and then to fold and heat seal the ends of the packaging about the product. The diversions and reciprocations of the product within the machine limit the production speed because of the time that must be allocated to such motions. Additionally, the motions of the machine parts required to change the direction of motion of the articles invariably leads to shock and vibration which can become severe as machine speed is increased. In addition, the mechanism for separating the heat sealable material is also crucial to the performance and efficiency of the machine. In many prior art devices, the speed of the wrapping machine is often limited by reason of having to cut a tube transversely as it is continuously fed forward. The cutting step makes it difficult or impossible to achieve a fully compressed or tightly wrapped product.

The drawbacks associated with many traditional wrapping devices were largely alleviated with the introduction of the infeed assembly disclosed in U.S. Pat. No. 7,398,630, the entire contents of which are expressly incorporated by reference to the present application. The infeed assembly disclosed in the '630 patent includes at least one infeed belt in communication with a continuous line of product and at least one registration belt downstream of the infeed belt. The registration belt moves at least one product temporarily at a velocity greater than the infeed belt thereby spacing one or more products into units to be wrapped. The continuous linear motion provided by this infeed assembly allowed much higher production speeds to be obtained than was possible with prior known systems. Nevertheless, there remains room for improvement in the form of further increasing production rates while assuring desired product spacing and positioning for wrapping or other operations.

SUMMARY OF THE INVENTION

In accordance with an aspect of the system, an infeed system is configured to feed compressible product to a processing machine for wrapping the product with a wrapping material such as a thermoplastic film. The product may be a single item such a roll of paper towels or grouped or bundled items such as napkins, rolls of toilet papers, or rolls of paper towels. The infeed system includes a first, second, and third conveyor sections, each having a top belt and a bottom belt that engage respective surfaces of the product.

The top and bottom belts of the first conveyor section may be configured to compress the product between the top and bottom belt. The product is compressed by positioning the top belt such that it is inclined with respect to the bottom belt at a compression angle. The belts may each grip the product firmly without slippage, possibly with the aid of a surface having a relatively high coefficient of static friction.

The top belt of the first conveyor section may move at a different speed than a speed of the bottom belt of the first conveyor section to compensate for a product skewing of the product caused by the compression angle.

The top and bottom belts of the second conveyor section may have a coefficient of static friction less than the coefficient of static friction of the top and bottom belts of the first conveyor section. The different frictional coefficients of the respective belts allow the product to slip as it transitions from the first conveyor section to the second conveyor section. The speed of the top and bottom belts of the second conveyor section may be periodically altered as the product enters this section so that products may be accepted into this section and grouped back to back with a controlled, potentially zero, gap between successive products, allowing for product separation for multi-item products or, stated another way, bundled or grouped products, to be processed. The speed of the belts of this section can then be increased once the correct group of products has been fully delivered into this section so that the speed of the belts, and thus of the product at the exit end of the second conveyor section matches the speed of belts of the third conveyor section.

The belts of third conveyor section may have a coefficient of static friction higher than that of the belts of the second conveyor section. This higher coefficient of static friction prevents the product from slipping as it transitions from the second conveyor system to the third conveyor section. The top and bottom belt of the third conveyor section may be driven at the same speed as a speed as the top and bottom belts of the second conveyor section. The speed of the third conveyor section may match the delivery speed of the wrapping material to the packaging machine, thereby allowing the product to be centered and positioned uniformly in between a predetermined length of wrap material required to wrap the product.

Also disclosed is a method of operating an infeed conveyor assembly having first, second, and third conveyor sections constructed at least generally as described above.

These and other aspects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof. It is hereby disclosed that the invention include all such modifications.

BRIEF DESCRIPTION OF THE DRAWINGS

Preferred exemplary embodiments of the invention is illustrated in the accompanying drawings in which like reference numerals represent like parts throughout, and in which.

DETAILED DESCRIPTION OF THE PREFERRED EMBODIMENT

Figure 1:
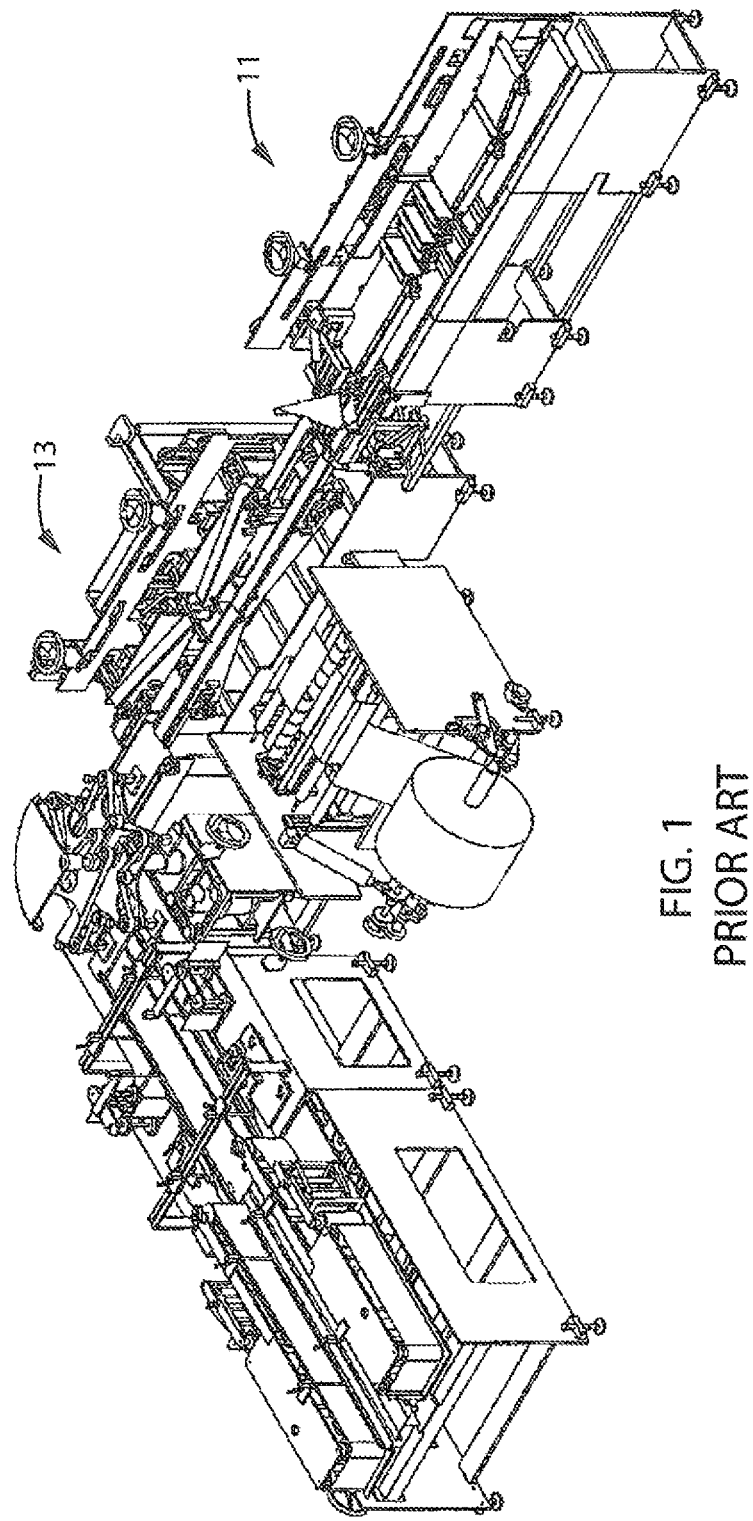
FIG. 1 is an elevated perspective view of a packaging machine feeding products by a known infeed system.

Referring now to the drawings and initially to FIG. 1, an infeed system 11 is shown as being positioned just upstream of a packaging machine 13 that packages products being delivered by the illustrated infeed system 11. The packaging machine is described in detail in U.S. Pat. No. 7,398,630, the entire contents of which are incorporated herein referred to by reference. Suffice it to say that it, or another packaging system, is configured to receive products from an infeed system 11 and package the received products, typically but not necessarily by wrapping them in heat sealable plastic and sealing the plastic to itself. The illustrated machine 13 forms a tube of wrapping B material, and spaced products are fed into the tube, one after another so that they spaced lengthwise in the tube of wrapping material at wrapper length intervals. The tube of wrapping material is then cut between adjacent products at locations corresponding to wrapper intervals by a moveable heated cutting element such as a heated knife or wire to form individual packages. The machine 13 then heat seals the ends of each cut tube to the remainder of the associated package to complete the package.

The infeed system 10 according to the present invention includes improvements to the successful infeed system of the '630 patent as shown in FIG. 1 and may be implemented in a similar manner as the known infeed system of the '630 patent.

Figure 2:
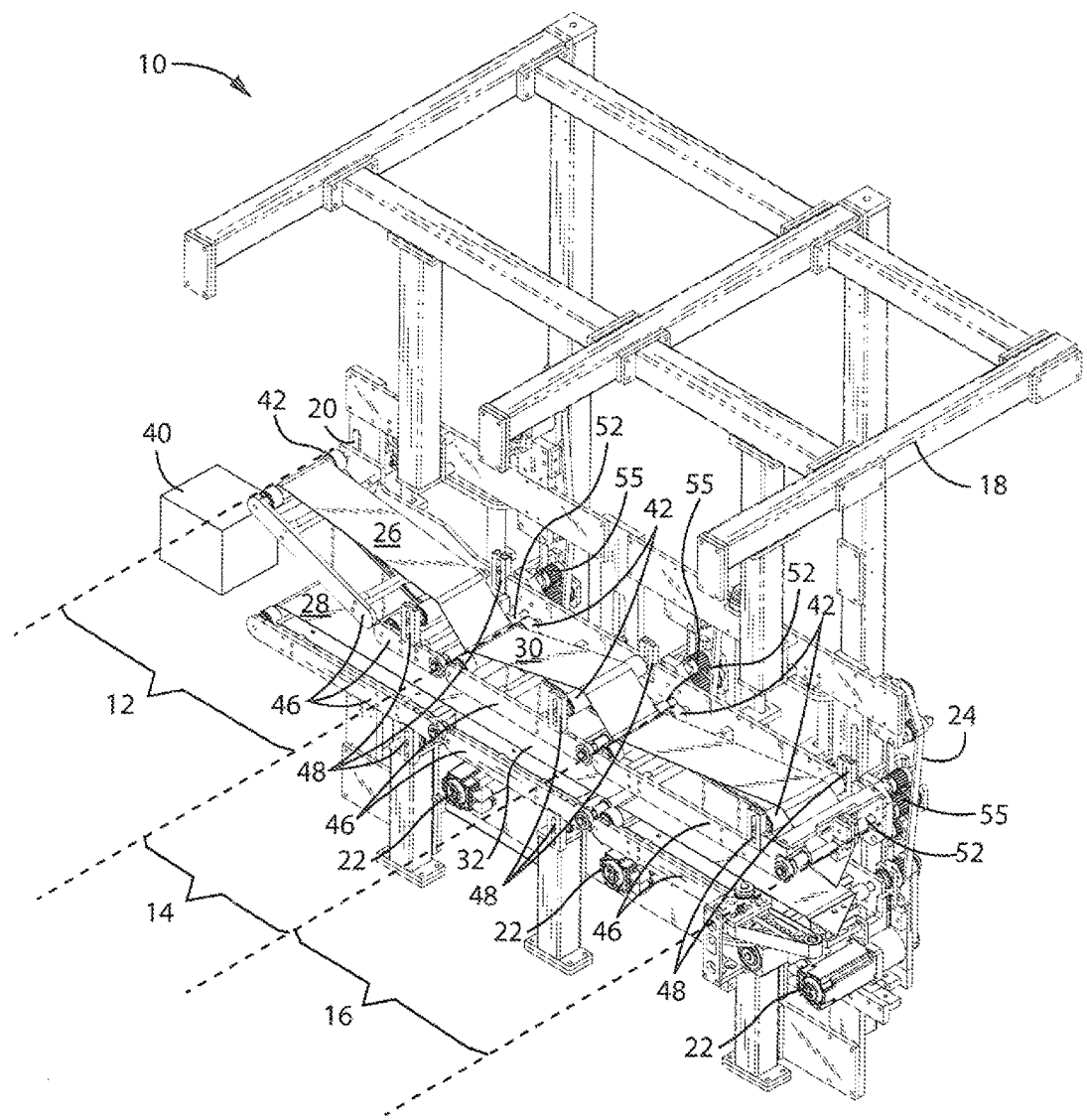
FIG. 2 is an elevated perspective view of an infeed system according to the present invention configured to deliver products to the packaging machine of FIG. 1.

The inventive infeed system 10 as shown in FIG. 2 may deliver products 40 in the form of stacked items such as napkins or rolled items such as paper towels or toilet paper. The stacked or rolled items may be bundled or otherwise grouped together to form a product 40. During wrapping, the products 40 are compressed and encased in a web of continuously moving thermoplastic wrapping material (not shown) e.g. polyethylene film, fed by a supply roll and formed into a tube around each product 40.

As shown in FIG. 2, the infeed system 10 comprises three conveyor sections of driven belts arranged in series, including: a first conveyor section 12, a second conveyor section 14, and a third conveyor section 16. Each one of the conveyor sections includes a top belt and a bottom belt. A shown in FIG. 2, the first conveyor section 12 includes a top belt 26 and a bottom belt 28. The second conveyor section 14 has a top belt 30 and a bottom belt 32. Similarly, the third conveyor section 16 has a top belt 34 and a bottom belt 36. Each of the top and bottom belts of each conveyor section is mounted on a support bar 46 with rollers 42 on each end of the support bars 46. The various rollers 42 keep the respective top and bottom belts in tension. All conveyor sections are mounted on a common system frame 18 and driven by servo drives 22 or the like under control of a Programmable Logic Controller, "PLC", or other programmed controller that controls the speed of the belts in each conveyor section. The PLC may also control other settings of the individual conveyor sections under feedback from various sensors.

The upper and lower belts of each section 12, 14, and 16 may be driven by a common servo drive 22 so that both belts of each section are always driven at the same linear speed. Alternatively, another drive unit may be configured to drive the top belt 26 of at least the first conveyor section 12 that is separate from the bottom belt 28. The provision of a separate servo or similar drive permits adjustment of the differential speed (if any) between the top and bottom belts 26 and 28 so as to accommodate variations in compression angles, product characteristics, etc. The PLC, or another controller operating independently of or in conjunction with the PLC, may also control the packaging machine.

Figure 8A:
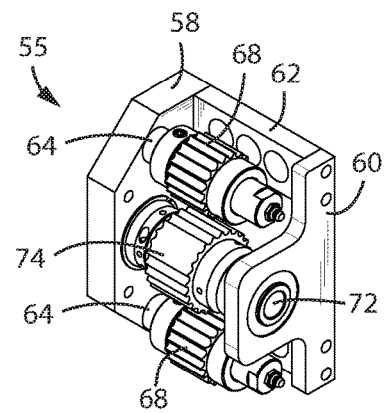
FIG. 8A is an elevated perspective view of an infeed drive system of the conveyor sections of the infeed system as shown in FIG. 2.
Figure 8B:
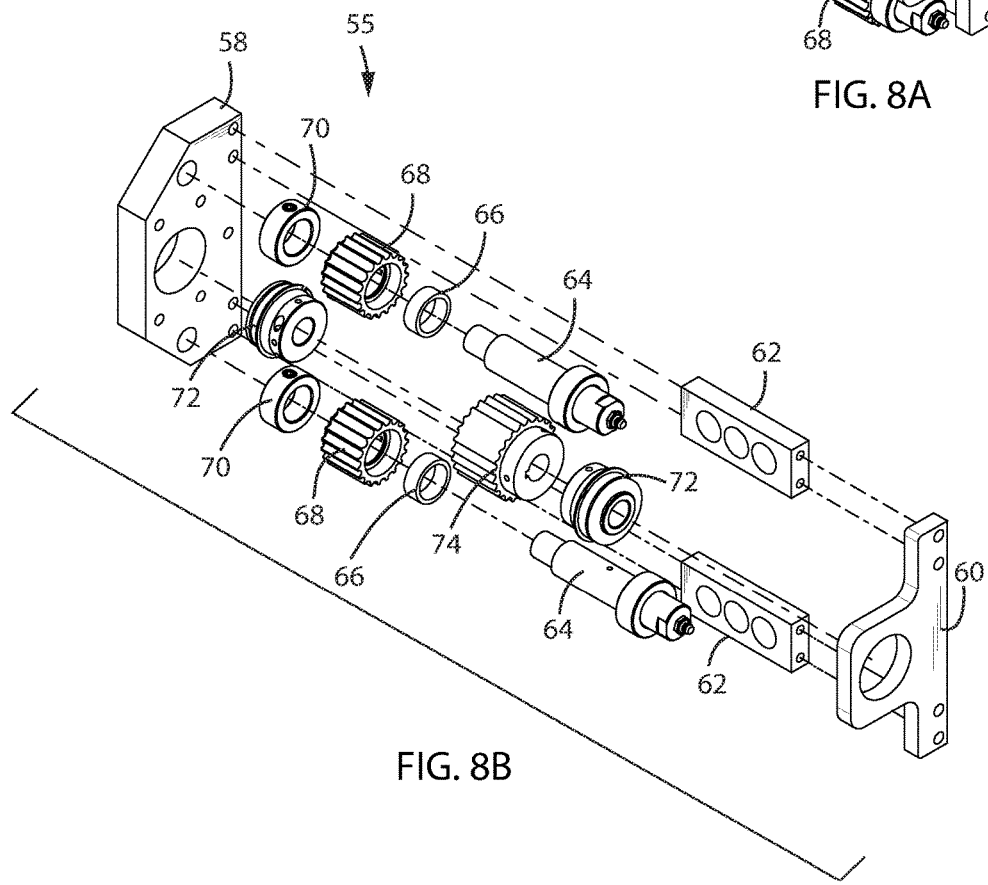
FIG. 8B is an exploded view of the infeed drive system as shown in FIG. 8A.

The servo drives 22 include power drive systems 55 which consist of various bearings, pulleys, and idlers, see, for example, FIGS. 8A and 8B. These drive systems relay the rotational motion supplied by the servo drives 22 to the individual driven rollers 42 on each conveyor section. Each servo drive 22 may be sped up or slowed down to accommodate for different spacing of multiple products 40 or to change overall product throughput rates. The servo drives 22 may also be coordinated to deliver multiple products 40 without any gaps between each respective product, or may group multiple unique products with predetermined spacing between each one.

The top belt and bottom belt of at least the first conveyor section 12 may also be positioned on the system frame 18 with a predetermined relative incline forming a compression angle 50. The compression angle causes the spacing between the top and bottom belts to diminish continuously along the length of the conveyor section so as, in operation to compress the product 40 to a desired size. For example, a single product 40 may include 100 sheets of stacked or bundled tissue paper. Tissue paper may be prone to absorb air and, as a result, become puffy. The top belt 26 of the first conveyor section 12 may therefore be inclined with a decreasing slope with respect to the bottom belt 28. The compression angle may, for example, be on the order of 20°, resulting in a change in the spacing between the belts of a conveyor section that is 18" long of about 24". The compression angle 50 can be adjusted by repositioning the top belt on the system frame 18 manually or automatically using, for instance, an appropriate drive and compression angle as feedback. Manual adjustment is facilitated by the fact that the modular nature of the various conveyor sections and the system frame 18 make it simple to loosen and reposition any component of the infeed system.

It should be noted that the bottom belt need not extend horizontally. The compression angle therefore should be thought of as the angle one of the two belts extends from a reference line along which the other belt travels.

Figure 3:
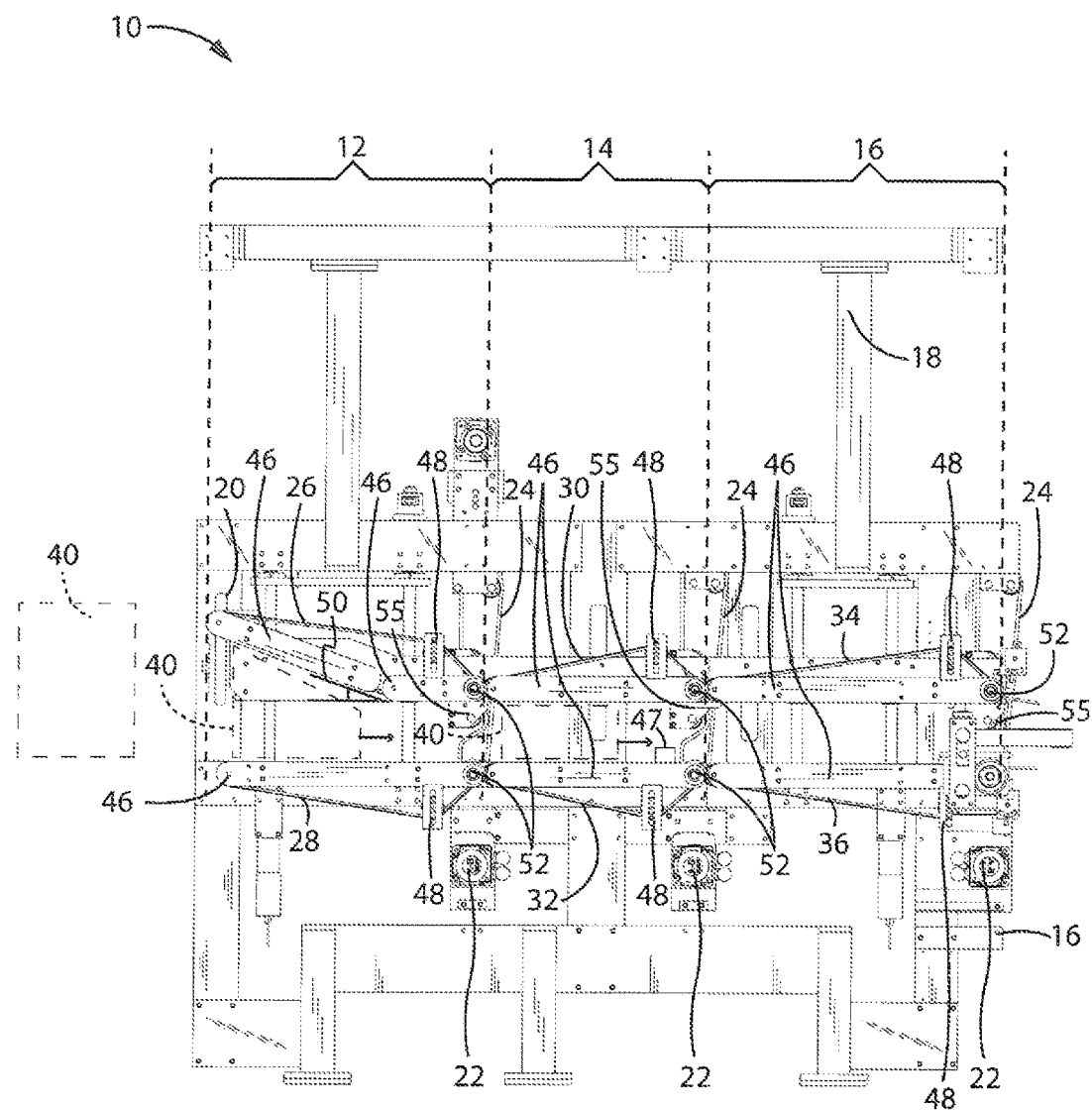
FIG. 3 is a side elevation view of the infeed system as shown in FIG. 2 with products shown in phantom lines.
Figure 4:
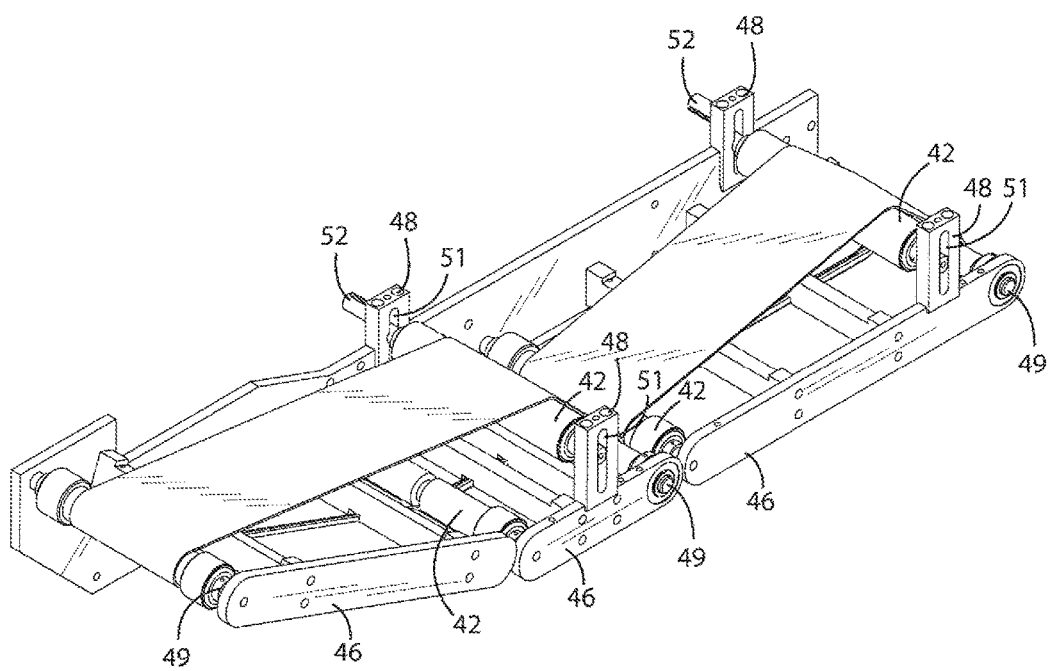
FIG. 4 is an elevated perspective view of the top belts of the first and second conveyor sections of the infeed system as shown in FIG. 2.

Looking to FIG. 3, the compression angle 50 of the top belt 26 can be best seen with the front view of the infeed system 10. The compression angle 50 can be adjusted by selectively pivoting the top belt support frame along an adjustment slot 20 in the frame 18. The first conveyor section 12 receives the product 40 from a supply conveyor (not shown) upstream of the infeed system 10. The cut and stacked paper forming the product 40 of this example is commonly fluffy and puffed, forming a large, rectangular figure. Multiple products 40 are continuously fed end to end without any gaps between the respective products 40 in between the top belt 26 and bottom belt 28 of the first conveyor section 12.

Compression of the product 40 as it is conveyed along the first conveyor section 12 in contact with the inclined top belt 26 can skew the product forwardly from the lower to upper surfaces of the product. In order to compensate for skewing of the compressed product 40, the speed of the top belt 26 can be controlled to be slightly more or less than the speed of the bottom belt 28. By setting an appropriate speed differential between the top belt 26 and bottom belt 28 of the first conveyor section 12, product skewing that otherwise would be caused by engagement with of the upper surface of the product 40 the inclined top belt 26 is avoided, thus keeping the product 40 in a tight, vertical stack despite the presence of compression angle 50 of the top belt 26. For example, the speed differential needs to be determined for each product dependent upon the compressibility of the product and the type and magnitude of product skewing that occurs during product compression.

No product compression is necessary when typical bathroom tissue, household towels, or other non-compressed paper products are used in the infeed system 10. For these materials, the relative inclination of the top and bottom belts of the first conveyor section 12 may be adjusted on the system frame 18 such that the top belt 26 may be parallel to the bottom belt 28 (resulting in a compression angle of 0°) and driven at the same speed. This control can be facilitated by using the same servo drive 22 to drive the top belt 26 that is used to drive the bottom belt 28. The effective speed of first conveyor section 12, that is, the speed at which product is advanced along he conveyor section, may be set to match the output rate of the output of wrapped products from the downstream packaging machine (see for example the machine 13 in FIG. 1). As an illustrative example; a ten inch long product may be produced by a packaging machine set to wrap one hundred products per minute. This processing time would require the conveyor belts of the infeed system 10 to run at a speed of one thousand inches per minute in order to deliver one hundred products per minute.

In order to process the incoming products 40 at such a high rate, the top belt 26 and bottom belt 28 of the first conveyor section 12 preferably have an aggressive surface with a relatively high coefficient of static friction. The high frictional surface allows the product 40 to be gripped firmly without slippage. The high friction surface of the belts of the first conveyor section 12 helps ensure no gaps will exist between adjacent products 40 in this section. The coefficient of static friction may, for example, range from 0.7-0.9. An acceptable surface is made of textured rubber, which has a coefficient of static friction of 0.8.

Still referring to FIGS. 2 and 3, the second conveyor section 14 similarly includes a top belt 30 and a bottom belt 32 that are each driven by the same or separate servos 22 or other drives. The top belt 30 and bottom belt 32 of the second conveyor section 14 may be driven at the same speed as there is no compression angle in this section. The product is delivered to the second conveyor section 14 in the form of a fully compressed unskewed product 40. Since the product in the conveyor section 14 requires no additional compression, the top belt 30 and bottom belt 32 can be parallel to one another along the entire effective length of conveyor section 14. The speed of the belts 30 and 32 of the second conveyor section 14 preferably is controlled to equal the speed of the belts 34 and 36 of the third conveyor section so that products 40 are conveyed through the second and third sections 12 and 14 at the same speed. That speed may be based on the wrapping speed of the machine 13 as discussed below.

The facing surfaces of top belt 30 and the bottom belt 32 of the second conveyor section 14 may have a lower coefficient of static friction than the top belt 26 and bottom belt 28 of the first conveyor section 12, thus allowing the product 40 to freely slip as the product is transferred into the second conveyor section 14 from the first conveyor section 12. The coefficient of static friction may, for example, range from 0.10-0.20. An acceptable surface is made of polyester with a urethane impregnation, which has a coefficient of static friction of 0.15.

The speed of the top belt 30 and bottom belt 32 of the second conveyor section 14 can also be altered as the product 40 is delivered to the second conveyor section 14 by the first conveyor section 12 so that multiple products 40 can be or accumulated into groups of products 40. As a result, the second conveyor section 14 can process groups of products 40, each group being made up of a unique product and unique product length, grouped back to back with minimal or no gaps between the products 40 of the group. The speed of the top belt 30 and bottom belt 32 of the second conveyor section 14 can then be increased once the desired grouping of compressed products 40 has been attained so that the grouped, compressed products 40 are delivered to the third conveyor section 16 at the same speed as the top belt 34 and bottom belt 36 of the third conveyor section 16. Hence, the top and bottom belts 34 and 36 of the second conveyor section 14 move at the same speed as one another and at the same speed, a faster speed, a slower speed, or a modulating speed as the top and bottom belts of the third conveyor section 16.

Movement of the compressed products 40 may also be monitored by an electronic eye 47, see for example FIG. 3, such as a laser or other optical recognition device. The electronic eye 47 may be used to fine tune the speed of the top belt 30 and bottom belt 32 of the second conveyor section 14 as required for unique compressed product lengths.

The third conveyor section 16 also includes a top belt 34 and bottom belt 36 forming the conveyor section 16. Since the product 40 in the conveyor section 16 requires no additional compression, the top belt 34 and bottom belt 36 can parallel to one another along the entire effective length of conveyor section 16, and the belts may be driven at the same speed, possibly using a common servo drive 22 to drive both belts 34 and 36. The facing surfaces of top belt 34 and bottom belt 36 of the third conveyor section 16 have a higher coefficient of static friction than the surfaces of the belts of the second conveyor section 14, so as to inhibit or prevent slippage of the compressed product 40 as it passes through the third conveyor section 16. The high-friction surface also serves to deliver the compressed product 40 into the downstream packaging machine. The belts 34 and 36 may, for example, be made from the same material and have the same coefficient of static friction as the belts 26 and 28 of the first conveyor section 12.

The speed of the top belt 34 and the bottom belt 36 of the third conveyor section 16 may be controlled by the PLC to match the delivery speed of a cut length of the wrapping material being conveyed through the packaging machine 13. This allows the compressed product 40 to be centered and positioned uniformly in between the required length of wrapping material required to wrap the products. The presence of the tube of wrapping material in machine 13 also maintains the compressed state of the compressed product 40. This minimizes the volume of the product and allows more product to be shipped in a given volume of container.

The individual components forming the first, second and third conveyor sections are shown in FIGS. 4-8B. Beginning with FIG. 4, the top belt 26 of the first conveyor section 12 is shown adjacent to the top belt 30 of the second conveyor section 14. Each one of the belts is driven by a series of rollers 42 rotatably mounted on a modular frame 46 formed from side plates and cross bars. Several rollers 42 are provided for each belt 26 or 30, all but one of which are mounted on idler shafts 49 positionally fixed to the frame 46. The last roller 42 associated with each belt 26 or 30 is driven via a splined drive shaft 52. The position of each idler roller 42 may be adjusted to set the tension of the belt by moving the associated idler shafts 49 up or down along a slot 51 in a corresponding adjustment block 48 of the frame 46. Raising the idler shaft 49 on the adjustment block 48 increases the tension on the belt, and lowering the drive shaft lowers the tension. This mounting also facilitates servicing of the belts. The servo drive 22 supplies motive force to the drive shafts 52 through drive systems 55 shown in FIGS. 8A and 8B as described below.

Figure 5:
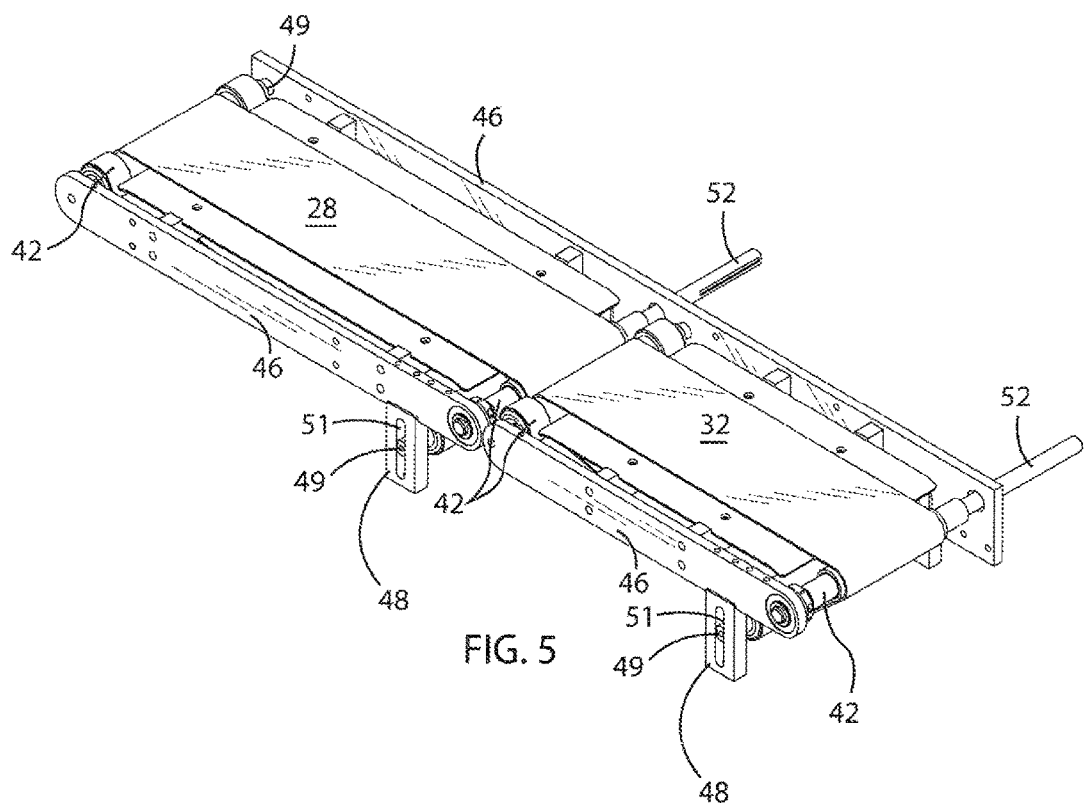
FIG. 5 is an elevated perspective view of the bottom belts of the first and second conveyor sections of the infeed system as shown in FIG. 2.

The bottom belt 28 of the first conveyor section 12 and the bottom belt 32 of the second conveyor section 14 are also shown in FIG. 5. The bottom belts 28 and 32 are assembled similarly to the top belts 26 and 30 described with respect to FIG. 4. The upper surface of each one of the bottom belts 28, 32 is illustrated as being horizontal, although adjustment is available by adjusting the mounting placement of the support frames 46 on the system frame 18, as shown in FIGS. 2 and 3. Three rollers 42 are provided for each belt 28 or 32, two of which are mounted on idler shafts 49 and one of which is mounted on a splined drive shaft 52. The position of one of the idler shafts 49 associated with each belt 28 or 32 may be adjusted to set the tension of the belt by moving the shaft 49 up or down along a slot 51 in a corresponding adjustment block 48 of the frame 46. Drive systems 55 (FIGS. 8A and 8B) accept power input from the servo drive 22 motors and transfer the rotational motion to the drive shafts 52 for the belts 28 and 32.

Figure 6:
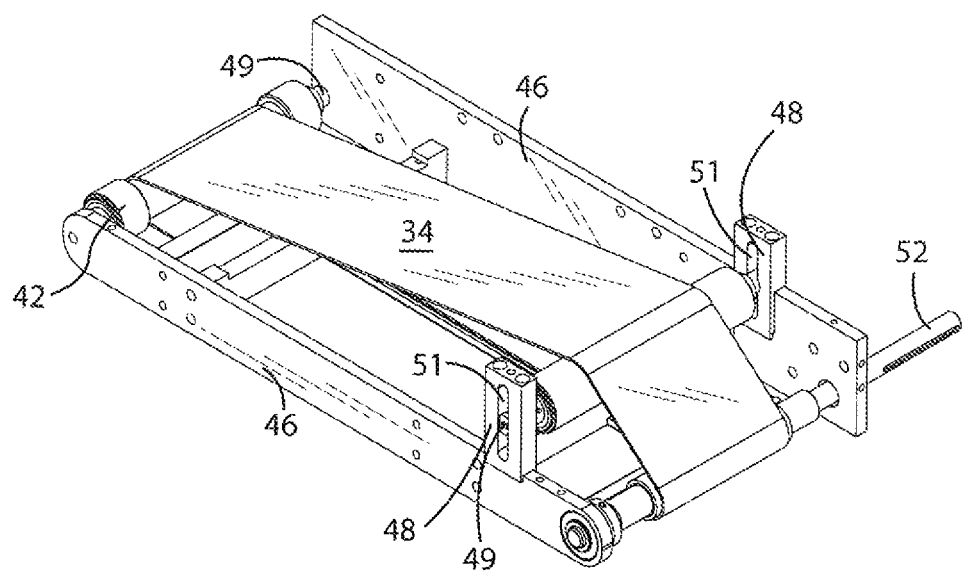
FIG. 6 is an elevated perspective view of a top belt of a third conveyor section of the infeed system as shown in FIG. 2.
Figure 7:
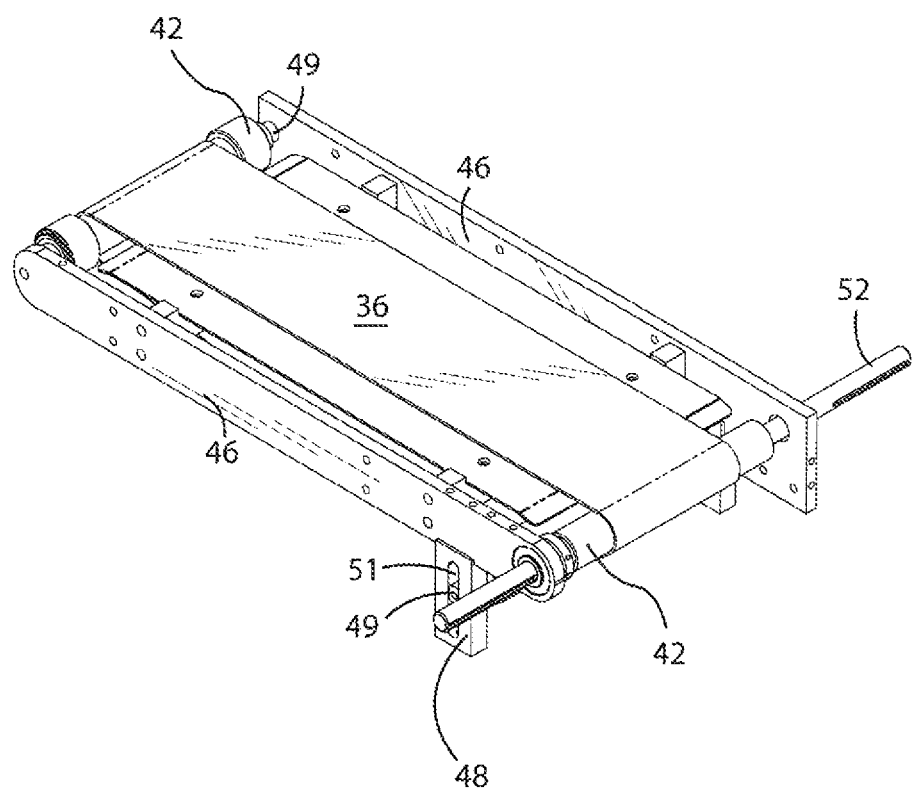
FIG. 7 is an elevated perspective view of a bottom belt for the third conveyor section of the infeed system as shown in FIG. 2.

FIGS. 6 and 7 show the top belt 34 and the bottom belt 36, respectively, of the third conveyor section 16. The top and bottom belts of the third conveyor section 16 are assembled similarly to the belts described with respect to the second conveyor section 14. The operative or product engaging surface of the top and bottom belts 34, 36 is illustrated as being horizontal throughout the contact area of the compressed product 40, although adjustment is available by adjusting the mounting placement of the support bars 46 and adjustment blocks 48 on the system frame 18, as shown in FIGS. 2 and 3. Three rollers 42 are provided for each belt 34 or 36, two of which are mounted on idler shafts 49 and one of which is mounted on a splined drive shaft 52. The position of one of the idler shafts 49 associated with each belt 34 or 36 may be adjusted to set the tension of the belt by moving the shaft 49 up or down along a slot 51 in a corresponding adjustment block 48 of the frame 46. Drive systems 55 (FIGS. 8A and 8B) accept power input from the servo drive 22 motors and transfer the rotational motion to the drive shafts 52.

The individual servo drive 22 motors transmit power to rotate each one of the belts of the infeed system 10 to a drive system 55 as seen generally in FIGS. 8A and 8B. Each drive system 55 includes a bearing plate 58 and a corresponding bearing plate 60. Bearing plate 58 mounts onto the system frame 18 shown in FIG. 2. In between the bearing plates 58, 60, shafts 64 hold idler sprockets 68 in place. Tie bars 62 hold the bearing plates 58 and 60 in place. Spacers 66 space out idler sprockets 68, and collars 70 lock the idler sprockets 68 into place. An infeed pulley 74 mounts to a splined shaft 52 which rotates on ball bearing packs 72 and receives a belt such as the belt 24 as shown in FIG. 2. The size of the pulleys and sprockets may be selected according to drive servo 22 output, but preferably the PLC is programmed to maintain desired belt speeds regardless of pulley and sprocket sizing.

It is appreciated that many changes and modifications could be made to the invention without departing from the spirit thereof. Some of these changes will become apparent from the appended claims. It is intended that all such changes and/or modifications be incorporated in the appending claims.

I claim:

1. An infeed system for feeding a product downstream to a packaging machine for packaging a product with a packaging material comprising:
   a first conveyor section having an inlet configured to receive product and having an outlet, the first conveyor section having a top belt and a bottom belt configured to convey product through the first conveyor section, wherein each of the belts of the first conveyor section has a relatively high coefficient of static friction;
   a second conveyor section having an inlet configured to receive product from the outlet of the first conveyor section and having an outlet, the second conveyor section having a top belt and a bottom belt configured to convey product through the second conveyor section, wherein each of the belts of the second conveyor section has a relatively low coefficient of static friction when compared to that of the belts of the first conveyor section;
   a third conveyor section having an inlet configured to receive product from the outlet of the second conveyor section, the third conveyor section having a top belt and a bottom belt configured to convey product through the third conveyor, wherein each of the belts of third conveyor section has a relatively high coefficient of static friction when compared to that of the belts of the second conveyor section.

2. The infeed system according to claim 1, wherein one of the top and bottom belts of the first conveyor section is inclined relative to the other of the top and bottom belts to form a compression angle therebetween that results in compression of the product between the top and bottom belt as the product is conveyed through the first conveyor section.

3. The infeed system according to claim 2, wherein the bottom belt of the first conveyor system extends at an invariable angle relative to the horizontal and the top belt of the first conveyor system extends at an angle that is adjustable to adjust the compression angle.

4. The infeed system according to claim 3, wherein the compression angle is adjustable from 0 to 30°.

5. The infeed system according to claim 1, wherein the top belt of the first conveyor section moves at a different speed than a speed of the bottom belt of the first conveyor section to compensate for a skewing of the product caused by a compression angle.

6. The infeed system according to claim 1, wherein the top belt and the bottom belt of the second conveyor section move at the same speed as one another and at the same speed, a faster speed, a slower speed, or a modulating speed as the top and bottom belts of the third conveyor section.

7. The infeed system according to claim 6, wherein the top and bottom belts of the third conveyor section are driven at a speed that matches a delivery speed of the packaging material to the packaging machine, thereby allowing the product to be centered and positioned uniformly in between a predetermined length of packaging material required to wrap the product.

8. The infeed system according to claim 1, wherein the outlet of the third conveyor section is configured to deliver the product directly to the packaging machine.

9. The infeed system according to claim 1, wherein the packaging machine is for packaging paper products and the packaging material is a thermoplastic packaging.

10. A method of operating an infeed system comprising the steps of:
feeding a product into a first conveyor section in between a top belt and a bottom belt;
compressing the product between the top and bottom belts, thus reducing a height of the product;
gripping the product with the top and bottom belts of the first conveyor section firmly without slipping;
advancing the product from the first conveyor section to a second conveyor section in between a top belt and a bottom belt of the second conveyor section while allowing slippage of product between the top and bottom belts of the second conveyor section;
advancing the product from the second conveyor section to a third conveyor section in between a top belt and a bottom belt of the third conveyor section while gripping the product with the top and bottom belts of the third conveyor section firmly without slipping;
matching a speed of the top and bottom belt of the third conveyor section with a delivery speed of a packaging material;
centering the product uniformly in between a predetermined length of packaging material required to wrap the product.

11. The method of operating the infeed system according to claim 10, wherein compressing the product in between the top belt and the bottom belt of the first conveyor section further comprises conveying product through a progressively narrowing gap between the top belt and the bottom belt.

12. The method of operating the infeed system according to claim 10, further comprising compensating for a skewing of the product by moving the top belt of the first conveyor section at a different speed than the bottom belt of the first conveyor section.

13. The method of operating the infeed system according to claim 10, further comprising moving the top and bottom belts of the second conveyor section at the same speed as one another, a faster speed, a slower speed, or a modulating speed and as the speed of the top and bottom belts of the third conveyor section.

14. The method of operating the infeed system according to claim 10, further comprising:
slipping the product between the respective top and bottom belts of the second conveyor section while transitioning the product from the first conveyor section to the second conveyor section; and
preventing the product from slipping between the respective top and bottom belts of the second and third conveyor section while transitioning the product from the second conveyor section to the third conveyor section.

15. The method of operating the infeed system according to claim 10, further comprising reducing the speed of the top and bottom belts of the second conveyor section as product enters the second conveyor section so as to group the products back to back without significant gaps therebetween, and then increasing the speed of the top and bottom belts of the second conveyor section to match the speed of the top and bottom belts of the third conveyor section.

16. The method of operating the infeed system according to claim 15, further comprising monitoring product position on the second conveyor section in order to compensate the speed of the product as required for variations of product length.

17. An infeed system for packaging a product with a packaging material comprising:
a first conveyor section having an inlet and outlet and configured to move the product between a top belt and a horizontal bottom belt, wherein the top belt of the first conveyor section is inclined at an adjustable compression angle with respect to the horizontal bottom belt for gradually compressing the product between the horizontal bottom belt and the inclined top belt of the first conveyor section as the product is conveyed through the first conveyor section;
a second conveyor section having an inlet that receives product from the outlet of the first conveyor section and having an outlet, the second conveyor section having a top belt and a bottom belt configured to maintain the product compressed between the bottom belt and the top belt of the second conveyor section;
a third conveyor section having an inlet that receives product from the outlet of the second conveyor section and having an outlet, the third conveyor section having a top belt and a bottom belt configured to maintain the product compressed between the bottom belt and the top belt of the third conveyor section, wherein a speed of the top and bottom belts of the third conveyor section match a delivery speed of the packaging material to a downstream packaging machine; and
wherein the top and bottom belts of the second conveyor section move at the same speed as one another and at the same speed, a faster speed, a slower speed, or a modulating speed as the top and bottom belts of the third conveyor section, and wherein the top and bottom belts of the second conveyor section have a lower coefficient of static friction than a coefficient of static friction of the top and bottom belts of the first conveyor section and the top and bottom belts of the third conveyor section.

18. The infeed system according to claim 17, wherein the top belt of the first conveyor section moves at a different speed than a speed of the bottom belt of the first conveyor section.

19. The infeed system according to claim 17, further comprising an electronic visual detector that monitors product position on the second conveyor section.

* * * * *